United States Patent
Nakase et al.

(10) Patent No.: US 9,767,390 B2
(45) Date of Patent: Sep. 19, 2017

(54) CARD CONNECTOR

(71) Applicant: FOXCONN INTERCONNECT TECHNOLOGY LIMITED, Grand Cayman (KY)

(72) Inventors: Yusho Nakase, Yokohama (JP); Sen Yang, Shenzhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/205,004

(22) Filed: Jul. 8, 2016

(65) Prior Publication Data

US 2017/0012376 A1 Jan. 12, 2017

(30) Foreign Application Priority Data

Jul. 8, 2015 (CN) ..................... 2015 2 0487018 U

(51) Int. Cl.
*H01R 12/71* (2011.01)
*G06K 13/08* (2006.01)
*G06K 7/00* (2006.01)

(52) U.S. Cl.
CPC ........... *G06K 13/08* (2013.01); *G06K 7/0021* (2013.01)

(58) Field of Classification Search
CPC . H01R 12/71; H01R 13/2414; H01R 13/6581
USPC ....... 439/630, 326, 327, 159, 188, 634, 636, 439/637, 654, 638, 607.31
See application file for complete search history.

(56) References Cited

U.S. PATENT DOCUMENTS

| | | | | |
|---|---|---|---|---|
| 5,474,472 A * | 12/1995 | Niwa | ................... | H01R 23/688 439/108 |
| 7,635,276 B1 * | 12/2009 | Chu | ................... | H01R 13/2442 439/326 |
| 8,292,642 B1 * | 10/2012 | Lee | ...................... | G06K 7/0026 439/159 |
| 8,371,879 B2 * | 2/2013 | Ida | ...................... | G06K 7/0021 439/327 |
| 2011/0151700 A1 * | 6/2011 | Shen | ...................... | H01R 12/83 439/326 |

FOREIGN PATENT DOCUMENTS

CN 204333364 U 5/2015

* cited by examiner

*Primary Examiner* — Harshad Patel
(74) *Attorney, Agent, or Firm* — Wei Te Chung; Ming Chieh Chang

(57) ABSTRACT

A card connector comprises an insulative housing, a shielding shell partly surrounding the insulative housing, a plurality of conductive contacts retained in the insulative housing and a shim retained in the insulative housing. The plurality of conductive contacts include a plurality of first conductive contacts, each first conductive contact includes a first retaining portion, a first soldering portion and a first elastic contacting portion. The first elastic contacting portion includes a bending portion, and the free end of said first elastic contacting portion is a support portion. At least one support portion is separated from the shim so as to the shim forms a T-shaped opening corresponding to the support portion and two stretching portions disposed on two sides of the opening, the support portion can slide on the stretching portions when the support portion is pressed.

11 Claims, 7 Drawing Sheets

CARD CONNECTOR

BACKGROUND OF THE INVENTION

1. Field of the Invention

The present invention relates to an electrical connector, more particularly to a card connector with a plurality of improved contacts.

2. Description of Related Art

China Patent No. 204333364U issued on May 13, 2015, discloses a card connector including an insulative base and a plurality of contacts retained in the insulative base. Each contact includes a soldering portion, a connecting portion having a frame structure and an elastic contacting portion stamped integrally, the insulative base defines a plurality of first moving cavities corresponding to the elastic contacting portion, respectively. The connecting portion includes a main base, the elastic contacting portion includes a mounting end integrally connecting to the main base and a free end separated from the main base, that corresponding to the elastic contacting portion leave a blanking gap on the main base. At least one side of the free end of the elastic contacting portion defines a widen portion extending integrally and outwardly therefrom, accordingly, said blanking gap includes a widen groove and the width of the widen groove is greater than the width of the widen portion, the rear end of the main base adjacent to widen groove forms a ground pad. However, the elastic contacting portion is formed by integrally molding and the manufacturing structure of the widen groove and the ground pad is complex; otherwise, there is a connecting portion with a frame plate structure, which has a higher manufacturing cost. Therefore, it has a defect that the manufacturing process is difficult and the manufacturing cost is high.

Hence, a card connector including an improved structure is desired to overcome the disadvantages of the related arts.

SUMMARY OF THE INVENTION

Accordingly, an object of the present invention is to provide a card connector with easy manufacturing process and lower manufacturing cost.

To achieve the above object, a card connector includes an insulative housing, a shielding shell partly surrounding the insulative housing, a plurality of conductive contacts retained in the insulative housing and a plurality of shims retained in the insulative housing. The plurality of conductive contacts include a plurality of first conductive contacts, each first conductive contact includes a first retaining portion, a first soldering portion and a first elastic contacting portion. The first elastic contacting portion includes a bending portion, and the free end of said first elastic contacting portion is a support portion. At least one support portion is separated from the shim so as to the shim forms a T-shaped opening corresponding to the support portion and two stretching portions disposed on two sides of the opening, the support portion can slide on the stretching portions when the support portion is pressed.

Other objects, advantages and novel features of the invention will become more apparent from the following detailed description when taken in conjunction with the accompanying drawings.

DETAILED DESCRIPTION OF THE PREFERRED EMBODIMENT

Figure 1:
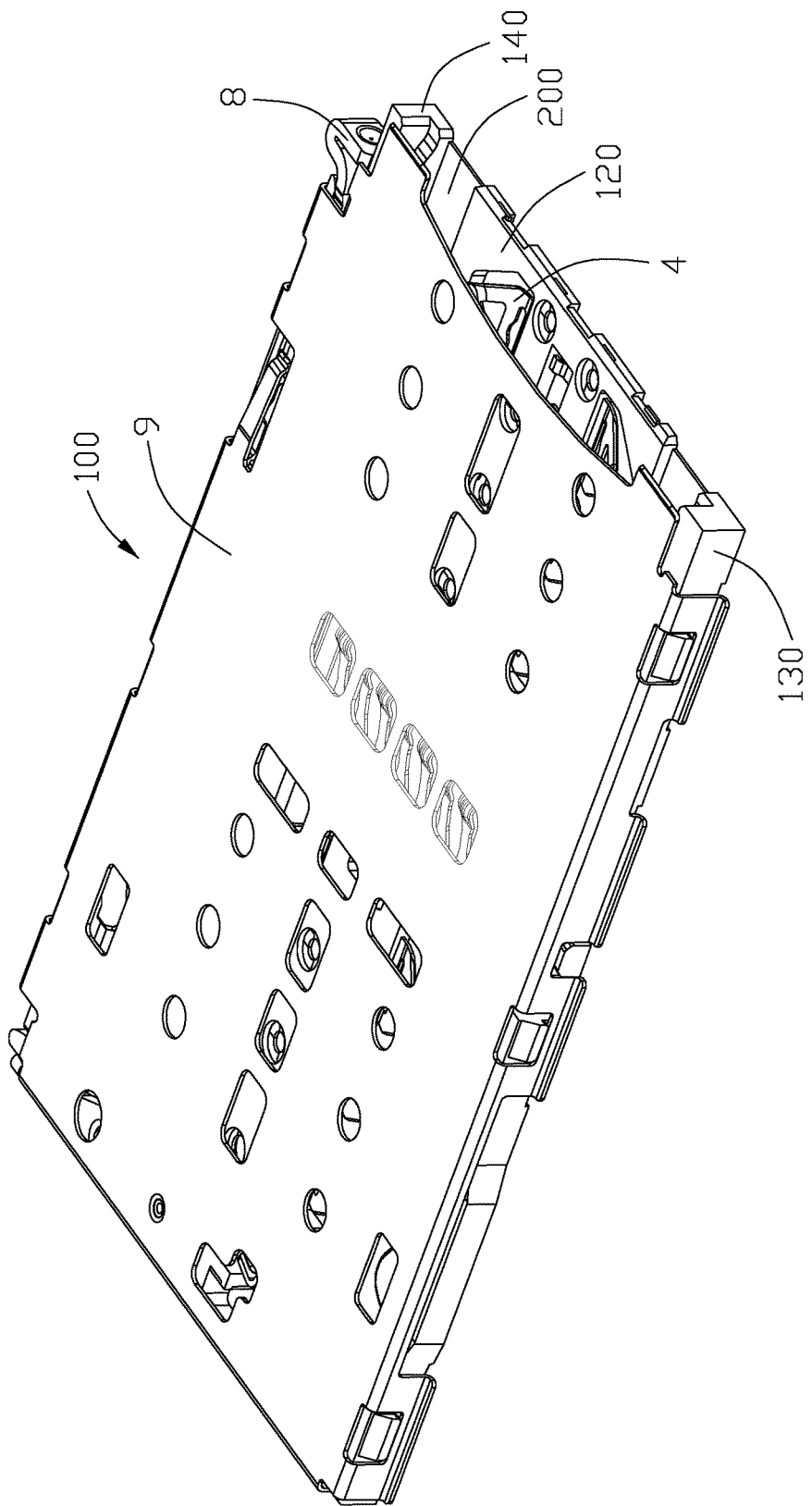
FIG. 1 is a perspective view of the card connector in accordance with the present invention.

Reference will now be made in detail to the preferred embodiment of the present invention. All the related direction of this invention is referring to FIG. 1, and the inserting opening of the card connector is defined to the front end. Referring to FIGS. 1 to 6, a card connector 100 comprises an insulative housing, a shielding shell 9 partly surrounding the insulative housing and forming a receiving cavity 200 with the insulative housing and a plurality of conductive contacts enclosed into the insulative housing. The insulative housing includes a first insulative housing 110, a second insulative housing 120, a third insulative housing 130 and a forth insulative housing 140 configured separately from each other. The conductive contacts include a plurality of first conductive contacts 2, a plurality of second conductive contacts 3 and a plurality of third conductive contacts 4. The card connector 100 further includes a plurality of shims 5 retained in the insulative housing and opposed to the corresponding first conductive contacts 2, a pair of locking members 6, a latching mechanism 8, a detecting contact 71, a switch contact 72 opposed to the detecting contact 71 and a tray (not shown) loading an electrical card (not shown).

Figure 2:
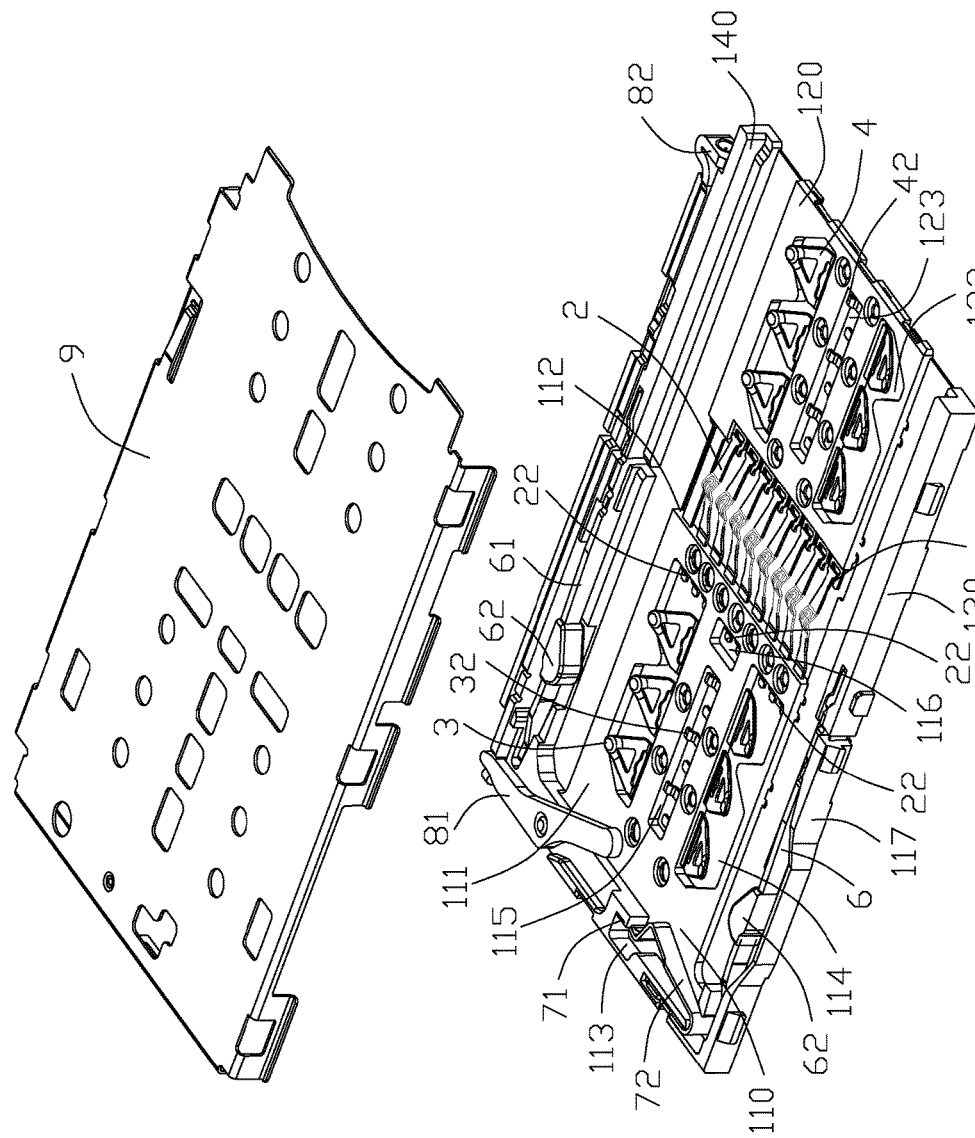
FIG. 2 is a perspective, partly exploded view of the card connector show in FIG. 1.
Figure 3:
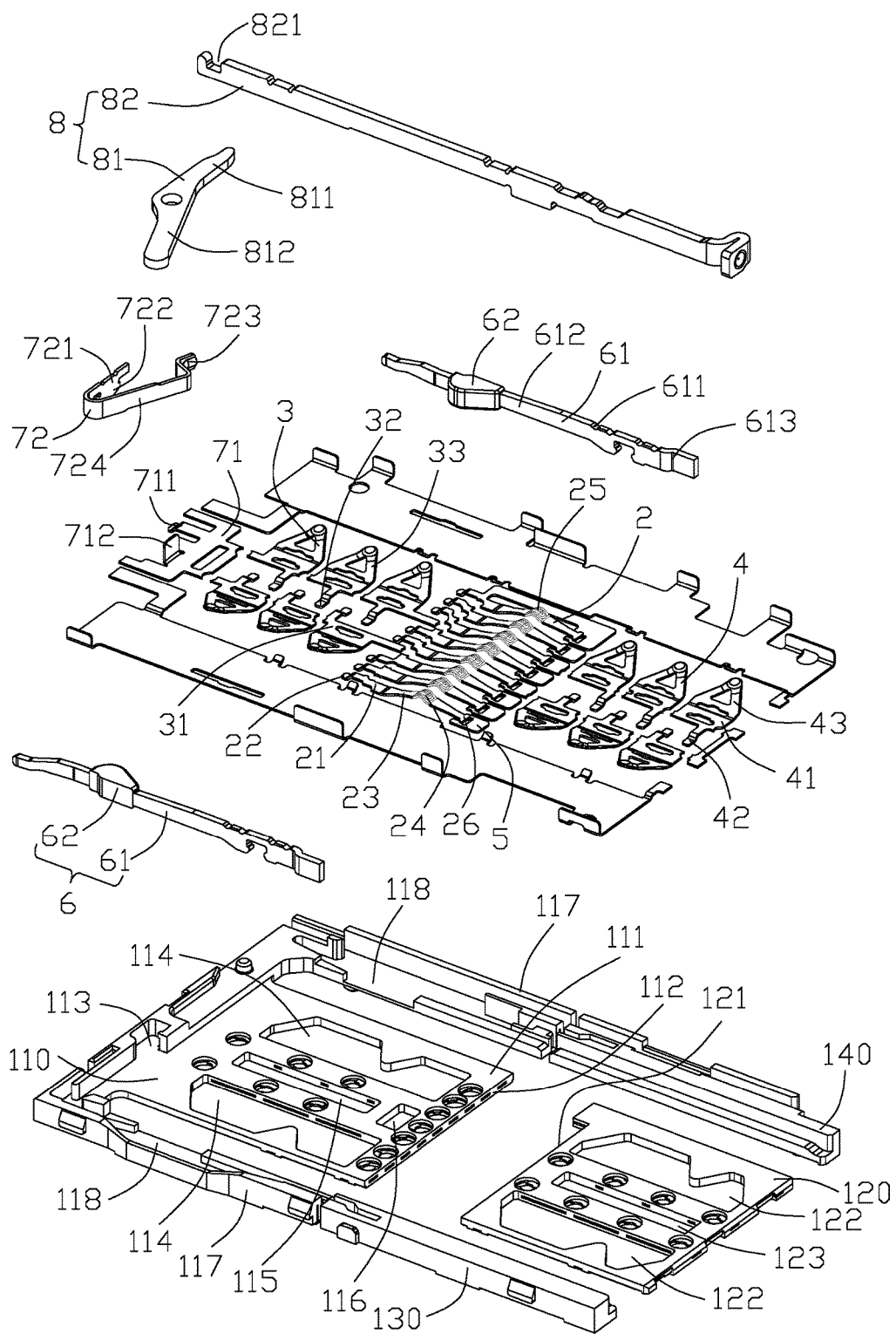
FIG. 3 is a perspective, exploded view after removing the shielding shell of the card connector show in FIG. 2.
Figure 4:
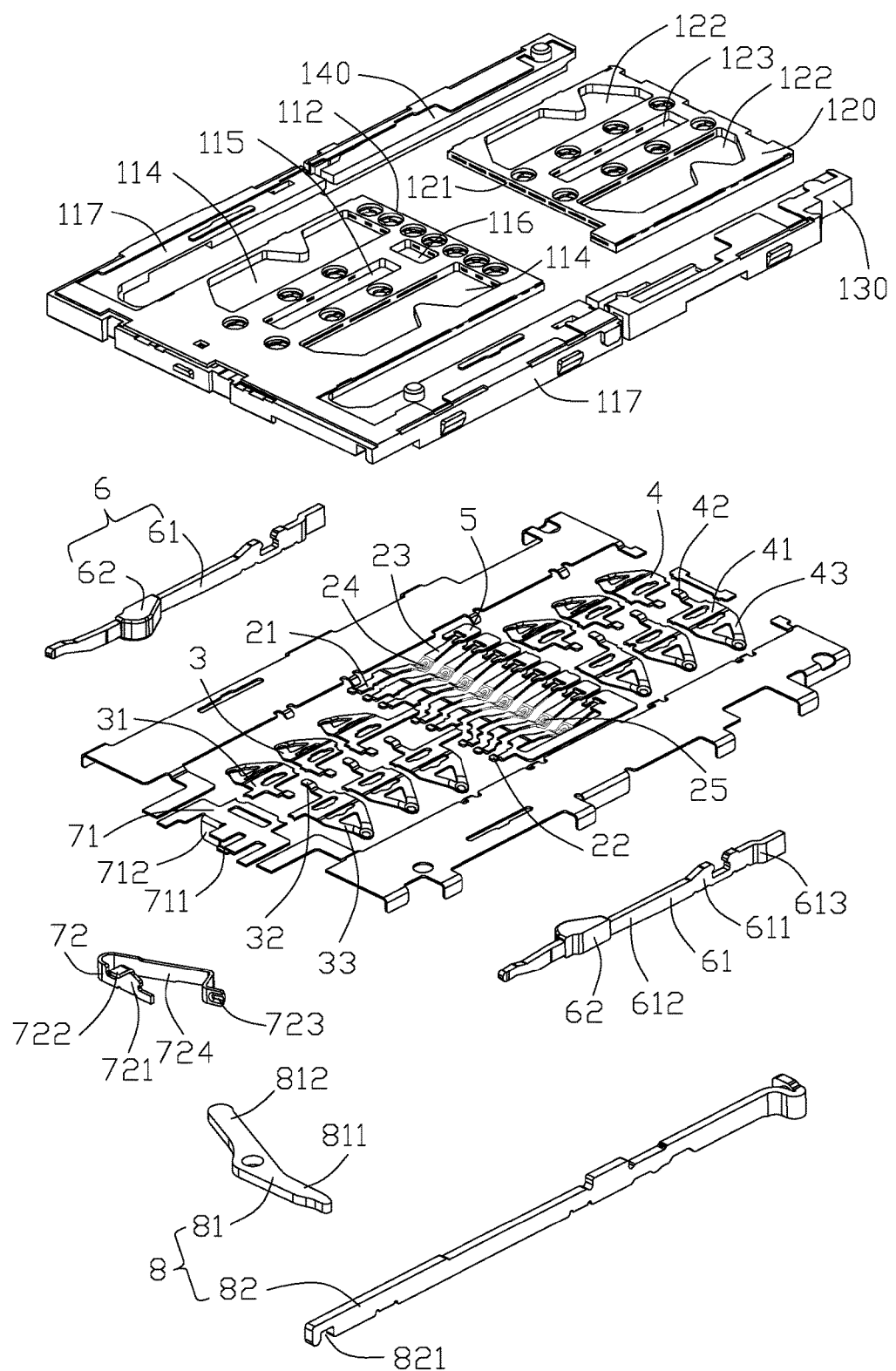
FIG. 4 is another perspective, exploded view of the card connector shown in FIG. 3.
Figure 5:
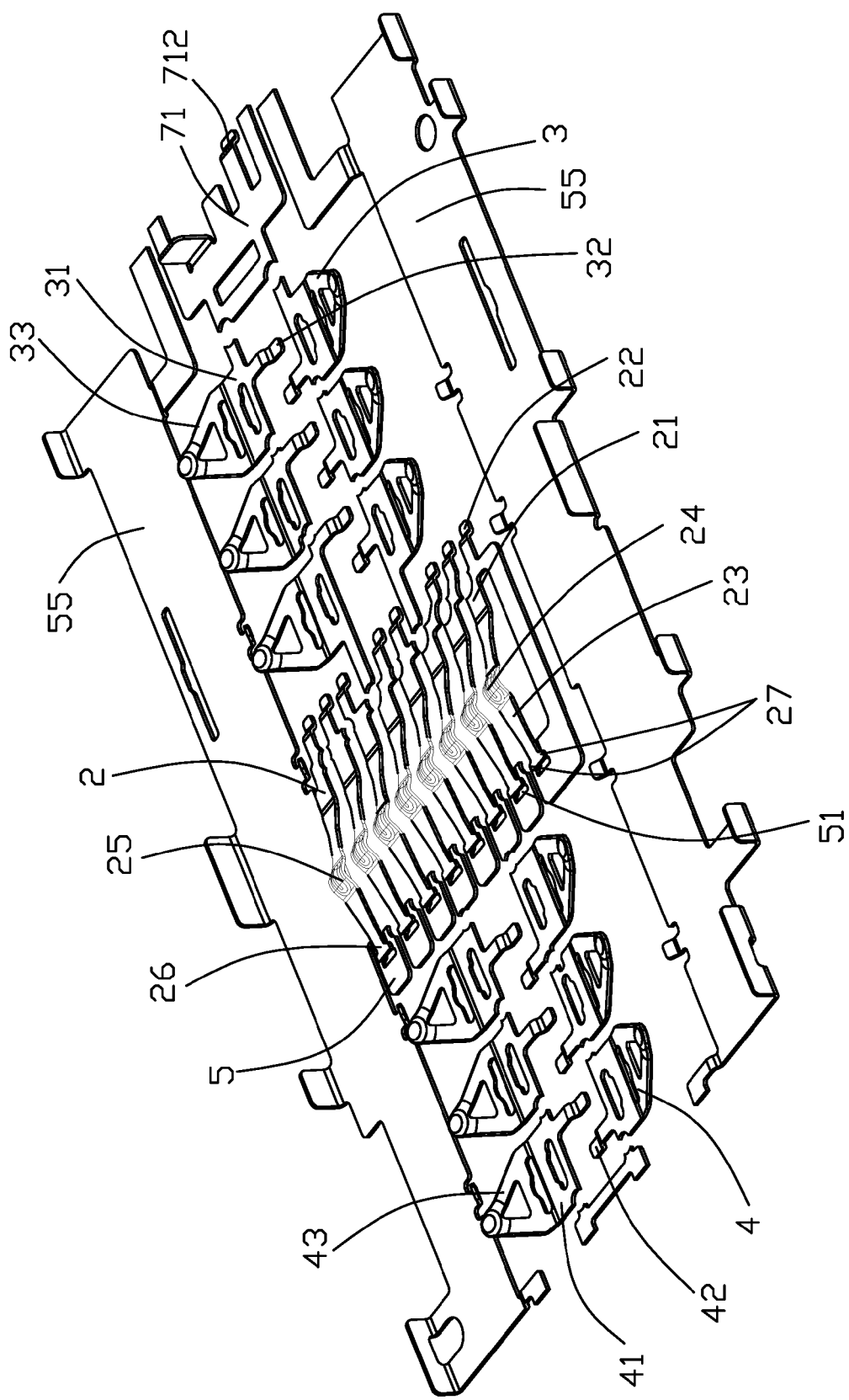
FIG. 5 is a perspective, combined view of the first conductive contact, the second conductive contact, the third conductive contact and the detecting contact of the card connector show in FIG. 3.
Figure 6:
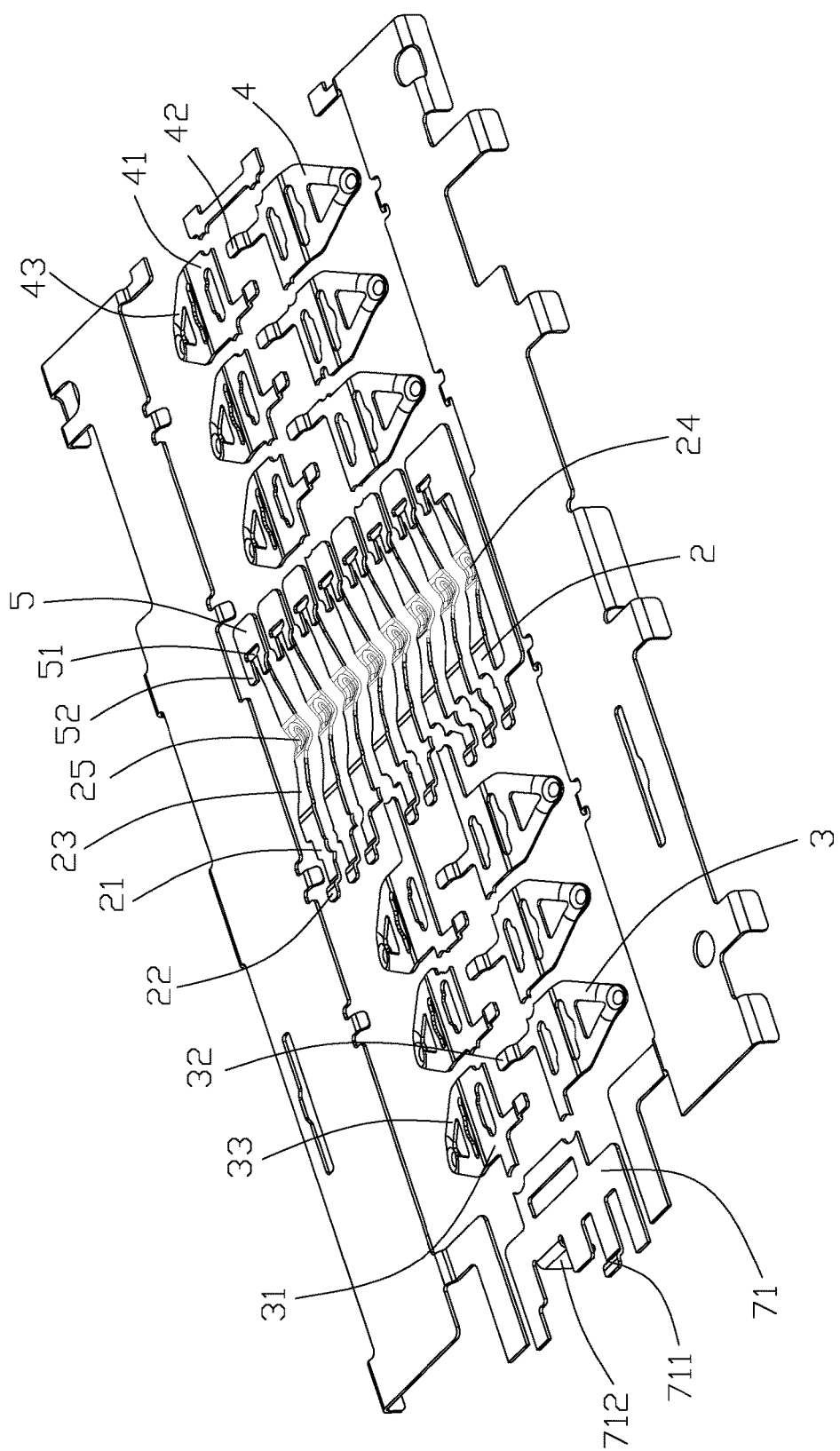
FIG. 6 is another perspective, combined view of the contacts of the card connector show in FIG. 5.
Figure 7:
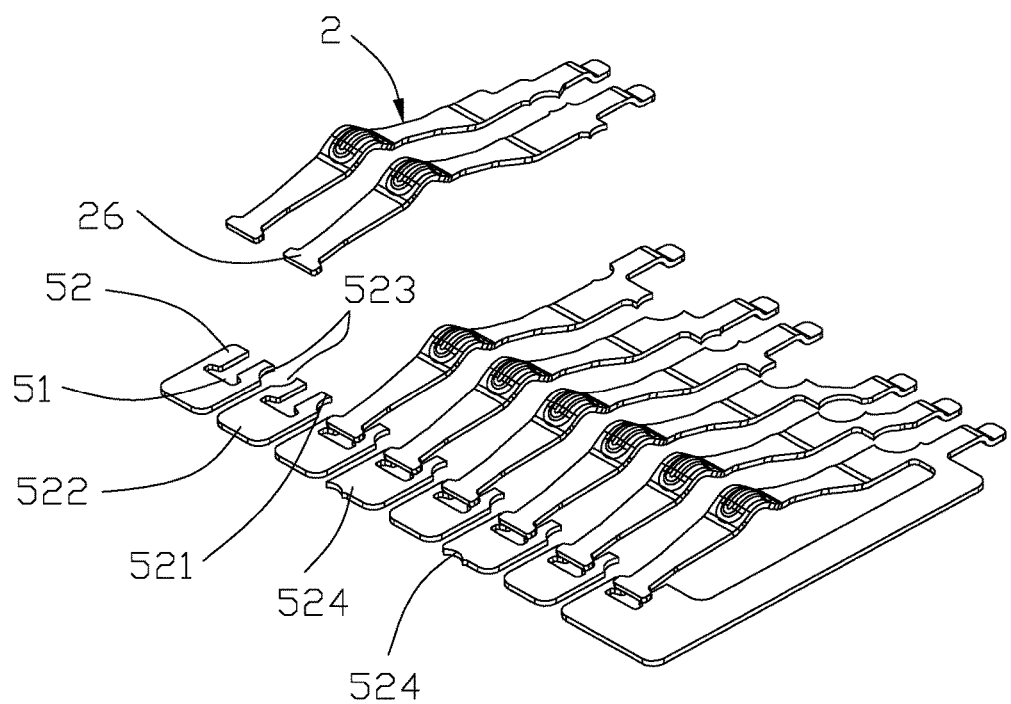
FIG. 7 is an enlarged partially exploded perspective view to show the first contacts and the corresponding shims of the card connector shown in FIG. 5.

Referring to FIGS. 2 to 4, the first insulative housing 110 is a M-shaped. The first insulative housing 110 includes a main body 111 and a pair of side walls 117 disposed at the two sides of the main body 111. The main body 111 defines a front portion 112, the pair of side walls 117 extend along the inserting direction and form a gap with the main body 111. The main body 111 includes a pair of first contact grooves 114 arranged side by side along a transverse direction perpendicular to the inserting direction, a second contact groove 115 and a third contact groove 116 arranged along the inserting direction. The second contact groove 115 and the third contact groove 116 are disposed between the pair of the first contact grooves 114, and the second contact groove 115 is disposed at the rear end of the third contact groove 116 in the inserting direction. In other embodiments, the second contact groove 115 can communicate with the third contact groove 116, or the third contact groove 116 can communicate with the pair of first contact grooves 114.

The second insulative housing 120 is arranged separately with the first insulative housing 110, the second insulative housing 120 defines a rear portion 121. The first insulative housing 110 is disposed in behind of the second insulative housing 120 in the inserting direction, the second insulative housing 120 includes a pair of forth contact grooves 122 arranged side by side along the transverse direction perpendicular to the inserting direction and a fifth contact groove 123 disposed between the pair of the forth contact grooves 122.

Both the third insulative housing 130 and the forth insulative housing 140 extend along the inserting direction, and the third insulative housing 130 and the fourth insulative housing 140 are disposed on the two sides of the second insulative housing 120 and located in front of the first insulative housing 110 in the inserting direction. Each of the third insulative housing 130 and the fourth insulative housing 140 forms a gap with the second insulative housing 120. The third insulative housing 130 and the forth insulative housing 140 are aligned respectively with the corresponding side walls 117 of the first insulative housing 110.

Referring to FIGS. 2 to 6, the plurality of conductive contacts comprise a plurality of first conductive contact/terminals 2 and second conductive contacts/terminals 3 retained in the first insulative housing 110 and a plurality of third conductive contacts/terminals 4 retained in the second insulative housing 120.

The first conductive contacts 2 are arranged side by side along the transverse direction perpendicular to the insertion direction, each first conductive contact 2 includes a first retaining portion 21, a first soldering portion 22 extending from one end of the first retaining portion 21 and a first elastic contacting portion 23 extending from the other end of said first retaining portion 21 in the transverse direction. The first retaining portion 21 is retained in the front portion 112 of the first insulative housing 110. The first soldering portions 22 are partly received in the pair of first contact grooves 114 and the third contact groove 116 respectively, in particular, each of the pair of the first contact grooves 114 receives three first soldering portions 22 and the third contact groove 116 receives two first soldering portions 22. The first elastic contacting portions 23 extend along the inserting direction and are located above the gap between the first insulative housing 110 and the second insulative housing 120. Each first elastic contacting portion 23 defines an inverted V-shaped bending portion 24, the bending portion 24 includes a protrusion 25 protruding upwardly for better electrically connecting with the contacting surface of the electrical card (not shown). The free end of said first elastic contacting portion 23 is a T-shaped support portion 26 stamped from the shim 5 so that the shim 5 forms a T-shaped opening 51 corresponding to the support portion 26 and two stretching portions 52 disposed on two sides of the opening 51. The support portion 26 can slide on the stretching portions 52 when the support portion 26 is pressed. The support portion 26 includes a pair of resisting portions 27 extending from two sides thereof in the transverse direction perpendicular to the inserting direction.

The second conductive contacts 3 are arranged symmetrically in two rows and extending along the transverse direction perpendicular to the inserting direction. Each second conductive contact 3 includes a second retaining portion 31 retained in the first insulative housing 110, a second soldering portion 32 extending from one end of the second retaining portion 31 and a second elastic contacting portion 33 extending from the other end of the second retaining portion 31. The second soldering portions 32 are received in the second contact grooves 115, the second elastic contacting portion 33 are arranged symmetrically in two rows and received in the pair of first contact grooves 114. The second elastic contacting portions 33 are arranged symmetrically in two rows and each elastic contacting portion 33 is a triangular shape and bending and extending upwardly from one end of the second mounting portion 721. The vertex of the second elastic contacting portion 33 defines a contacting point connecting electrically with the electrical card (not shown).

The structure of the second conductive contacts 3 is same to the third conductive contacts 4, each of third conductive contacts 4 includes a third retaining portion 41 retained in the second insulative housing 120, a third soldering portion 42 extending from one end of the third retaining portion 41 and a third elastic contacting portion 43 extending from the other end of the third retaining portion 41. The third soldering portions 42 are received in the fifth contact groove 123, the third elastic contacting portions 43 are arranged symmetrically in two tows and received in a pair of forth contact grooves 122. The third elastic contacting portions 43 are symmetrically arranged in two rows and each third elastic contacting portion 43 is a triangular shape and bending from one end of the third mounting portion. The vertex of the third elastic contacting portion 43 is defined a contacting point connecting electrically with the electrical card (not shown).

Referring to FIGS. 2 to 6, the shims 5 are retained in the behind of the second insulative housing 120. The shims 5 are separated from the first conductive contacts 2, the shims 5 are arranged opposite to first retaining portion 21 and corresponding to the support portions 26. The support portion 26 is formed by the shim 5 stamping integrally, the shim 5 includes a T-shaped opening 51 corresponding to the support portion 26 and two stretching portions 52 disposed on two sides of the opening 51. The opening 51 is formed by the the support portion 26 stamped from the shim 5. The support portion 26 is located above the stretching portion 52 or abutting on the surface of stretching portion 52. When the first elastic contacting portion 23 is under downward pressure, the resisting portions 27 of the support portion 26 abut said stretching portion 52 and slide on the stretching portion 52.

Referring to FIGS. 2 to 6, the pair of locking members 6 are disposed in a pair of inner walls of the first insulative housing 110, respectively. The locking member 6 includes a metal arm 61 retained in the side wall 117 and an arcuated projection 62 partly surrounding said metal arm 61. The metal arm 61 includes a first mounting portion 611 retained in the side wall 117, an elastic arm 612 extending from one end of said first mounting portion 611 and received in moving space 118 of the side wall 117 and a board lock 613 extending and bending from the other end of the mounting portion 611. The elastic arm 612 can deform elastically in the moving space 118. The board locks 613 of the pair of locking members 6 are respectively fixed in the third insulative housing 130 and the fourth insulative housing 140. The arcuated projection 62 is located on the elastic arm 612 and extending outside of the side wall 117 toward to the receiving cavity 200. The pair of locking members 6 are used to lock a tray (not shown) when the tray is inserted.

Referring to FIGS. 2 to 6, the detecting contact 71 and the switch contact 72 are retained in the first insulative housing 110. The rear end of the first insulative housing 110 forms a receiving space 113, the detecting contact 71 is received in the receiving space 113 and includes a first soldering tail 711 and a sensing portion 712. The sensing portion 712 of the detecting contact 71 is retained in the inner sidewall of the receiving space 113. The switch contact 72 is disposed in the rear end of the first insulative housing 110 and includes a second mounting portion 721, a second soldering tail 722 extending downwardly from the second mounting portion 721, a contacting portion 723 received in the receiving space 113 and a connecting portion 724 connecting said second mounting portion 721 and contacting portion 723. The contacting portion 723 is electrically connecting with the sensing portion 712.

Referring to FIGS. 2 to 6, the latching mechanism 8 includes a pivoting piece 81 coordinating with the first insulative housing 110 and a putter 82 linked with the pivoting piece 81. The pivoting piece 81 defines an actuating arm 811 linked with the putter 82 and an upper push arm 812 linked with the tray (not shown). The putter 82 includes a notch 821 used to receive the actuating arm 811, the actuating arm 811 is overlapped in the notch 821 so as to make a stable linkage effect between the pivoting piece 81 and putter 82.

When the first conductive contacts 2 are under a downwardly pressure from the electronic card (not shown), the support portions 26 are abutting on the stretching portions 52. At this point, the first elastic contacting portions 23 form a simply supported structure, the resisting portions 27 of the two sides of support portions 26 can slide on the stretching portions 52, thereby regulating the height of first elastic contacting portions 23 so as to ensure a stable connection between the contacting surface of the first conductive contacts 2 and the electronic card (not shown). Furthermore, the first conductive contacts 2 can be effectively prevented from being damaged.

When the card is not inserted, the contacting portion 723 and the sensing portion 712 of the switch contact 72 are electrically connected to detect the card not inserted. When the card is inserted in, the tray (not shown) is driven from the opening 51 of the receiving cavity 200, the rear end of the tray (not shown) is touching the connecting portion 724 of the switch contact 72 and driving it to slide backwardly. When the card is fully inserted, the contacting portion 723 of the switch contact 72 is separated from the sensing portion 712 to form a no electrical connecting state so as to detect the card inserted fully, at the same time, the arcuated projection 62 of the locking member 6 is retained in the positioning slot of the tray (not shown) so as to achieve an stably locking effect. When the card is ejected, the putter 82 is pushed forward, and the actuating arm 811 lapped on the notch 821 of the putter 82 is driven to move with the putter 82, thus the upper push arm 812 is moving backward to push the tray (not shown) to move backward. After the card is ejected, the sensing portion 712 and the contacting portion 723 of the switch contact 72 are electrically connected so as to detect the card exit.

Compared with the traditional card connector, said support portions 26 are integrally stamped from the shim 5 and directly abutting the stretching portion 52 to slide, which not only could effectively enhance the stability of the contact and prevent the conductive contact from being damaged, but also could effectively reduce the manufacturing difficulties; Furthermore, the shim 5 is separated from the first conductive contact 2 so as to achieve the purpose of reducing the manufacturing cost.

Another feature is to have the shim 5 mechanically and electrically separated from the corresponding conductive contact 2 except the support portion 26 abuts thereagainst when the tray/card is inserted into the housing. Notably, the soldering portion 22 and the support portion 26 are located at opposite ends of the whole contact 2 so as to have the soldering portion 22 closer to the retaining portion 21 while being relatively far away from the corresponding shim 5 without connection therebetween for avoiding improper influence derived from confrontation between the support portion 26 and the shim 5 during operation, thus assuring reliable soldering effect thereof.

It is also noted that each shim 5 defines opposite inner end side 521 and outer end side 522 on the stretching portion 52. Originally, on one hand there are several bridges (not shown) each linked between the adjacent two shims 5 around the inner end side 521 for positioning consideration while such bridges are removed to separate those shims 5 from one another for no shorting therebetween, after the housing is integrally formed with the shim 5/contacts 2, 3, 4 via the insert-molding process, thus showing the corresponding cut-off edge 523 thereabouts. On the other hand, some shims 5 are originally unitarily linked with the corresponding third contacts 4 via corresponding bridges (not shown) around the outer end sides 522 which are successively removed after the insert-molding process, thus leaving corresponding cutoff-edges 524 thereabouts. It should be noted that the housing including the first housing 110, the second housing 120, the third housing 130 and the fourth housing 14, are simultaneously formed with the metallic first contacts 2, the metallic second contacts 3, the metallic third contacts 4, the metallic shims 5 and the pair of metallic reinforcement side plates 55, via a single insert-molding process conveniently wherein the first contacts 2, the second contacts 3, the fourth contacts 4, the shims 5 and the reinforcement side plates 55 are not unitarily linked with but electrically isolated from one another once the whole connector is completely made, thus assuring both the mechanical and electrical performance.

It is also noted that in this embodiment the reinforcement plate 55 linked between the first housing 110 and the second housing 120 with some portions exposed to an exterior in the vertical direction. Understandably, the tray (not shown) may be equipped with the grounding tangs to mechanically and electrically contact to the reinforcement side plates 55 for grounding consideration. It is also noted that in this embodiment the shim 5 is aligned with the corresponding first contact 2 in the longitudinal direction of the housing, and the shims 5 or the first contacts 2 are arranged in one row along the transverse direction perpendicular to the longitudinal direction.

It is also noted that because the contacts 2 are arranged with a fine pitch, no sufficient space is formed between the neighboring contacts 2 to form the partition by the housing to restrict the contacts 2 in the transverse direction. Therefore, it is very important to have the support portion 26 seated upon the corresponding shim 5 so as to convert the cantilevered type beam, i.e., one fixed end and one free end, to the restrained beam type, i.e., one fixed end and one sliding support end, thus assuring the reliable compression of the contact during operation without transverse deviation.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector comprising:
an insulative housing;
a shielding shell partly surrounding the insulative housing and forming a receiving cavity with the insulative housing;
a plurality of conductive contacts retained in the insulative housing and including a plurality of first conductive contacts, each first conductive contact including a first retaining portion retained in the insulative housing, a first soldering portion extending from one end of the first retaining portion and a first elastic contacting portion extending from the other end of said first retaining portion, the first elastic contacting portion including an inverted V-shaped bending portion, and the free end of said first elastic contacting portion being a T-shaped support portion; and a shim retained in the insulative housing; wherein at least one support portion is separated from the shim so that the shim forms a T-shaped opening corresponding to the support portion and two stretching portions disposed on two sides of the opening, the support portion slides on the stretching portions when the support portion is pressed; wherein the insulative housing includes a first insulative housing and a second insulative housing separated from each other, the first insulative housing is disposed in behind of the second insulative housing in an inserting direction, the first retaining portion is retained in the front of the first insulative housing, and the shim is retained in the behind of the second insulative housing.

2. The card connector as claimed in claim 1, wherein the first elastic contacting portion is located above a gap between the first insulative housing and the second insulative housing.

3. The card connector as claimed in claim 1, wherein a pair of resisting portion are extending from both sides of the support portion in a transverse direction perpendicular to the inserting direction, the resisting portions are abutting the stretching portions and could slide on the stretching portions.

4. The card connector as claimed in claim 3, wherein the first conductive contacts are arranged side by side along the transverse direction perpendicular to the insertion direction.

5. The card connector as claimed in claim 1, wherein the conductive contacts further includes a plurality of second conductive contacts retained in the first insulative housing and a plurality of third conductive contacts retained in the second insulative housing, the second conductive contacts are arranged symmetrically in two rows and extending along a transverse direction perpendicular to the inserting direction, each second conductive contact includes a second retaining portion retained in the first insulative housing, a second soldering portion extending from one end of the second retaining portion and a second elastic contacting portion extending from the other end of the second retaining portion, the second elastic contacting portions are arranged symmetrically in two rows.

6. The card connector as claimed in claim 5, wherein the first insulative housing includes a pair of first contact grooves arranged side by side along the transverse direction perpendicular to the inserting direction for receiving said second elastic contacting portions and a part of the first soldering portions, a second contact groove disposed between the pair of the first contact grooves to receive the second soldering portions and a third contact groove for receiving the other part of the first soldering portions, the third contact groove is disposed in front of the first contact grooves in the inserting direction, the first soldering portions of the first conductive contacts are partly received in the first contact grooves and the third contact groove.

7. The card connector as claimed in claim 5, wherein the third conductive contact is similar to the second conductive contact and each defines a third retaining portion, a third soldering portion and a third elastic contacting portion, the second insulative housing includes a pair of forth contact grooves arranged side by side along the transverse direction perpendicular to the inserting direction for receiving said third elastic contacting portions and a fifth contact groove disposed between the pair of the forth contact grooves to receive the third soldering portions.

8. The card connector as claimed in claim 1, wherein the bending portion defines a protrusion protruding upwardly.

9. A card connector assembly comprising:

an insulative housing;

a plurality of contacts arranged in one row along a transverse direction and integrally formed with the housing via an insert-molding process, each of said contacts defining two opposite fixed and free ends along said longitudinal direction with a retaining portion and a soldering portion commonly at said fixed end, and with a support portion at said free end, an elastic contacting portion being located between the fixed and the free end; and a plurality of shims arranged in another row along said transverse direction integrally formed with the housing via said insert-molding process and aligned with the corresponding contacts, respectively, along a longitudinal direction perpendicular to said transverse direction; wherein each of most of said the shims is located at the free end of the corresponding contact and is separated from the corresponding contact without unitary linkage therebetween, and the support portion of the corresponding contact supportably moves along the corresponding shim when the contacting portion is deflected in a vertical direction perpendicular to both said transverse direction and said longitudinal direction;

and a pair of reinforcement side plates located by two sides of said contacts and said shims in the transverse direction and electrically isolated from both said contacts and said shims, wherein said housing includes a first housing and a second housing spaced from each other in the transverse direction and linked by said reinforcement plates in said transverse direction so as to have said reinforcement side plates upwardly exposed in the vertical direction.

10. The card connector assembly as claimed in claim 9, wherein each of said shims defines opposite inner and outer ends, the inner end facing toward the corresponding contact while the outer end facing away from the corresponding contact, and the outer ends of some of said shims forming cut-off edges facing some other terminals which are retained by the housing via the same insert-molding process.

11. The card connector assembly as claimed in claim 9, wherein the housing forms an opening to expose the elastic contacting portions of all the contacts and another opening to expose the soldering portions of all the contacts in said vertical direction.

* * * * *